(No Model.)

J. VALERO.
THREAD CUTTER FOR SEWING MACHINES.

No. 287,197. Patented Oct. 23, 1883.

Witnesses:
L. E. Hills
W. B. Masson

Inventor.
Jose Valero
by E. E. Masson
atty.

UNITED STATES PATENT OFFICE.

JOSE VALERO, OF HAVANA, CUBA.

THREAD-CUTTER FOR SEWING-MACHINES.

SPECIFICATION forming part of Letters Patent No. 287,197, dated October 23, 1883.

Application filed July 21, 1883. (No model.)

*To all whom it may concern:*

Be it known that I, JOSE VALERO, a subject of the King of Spain, residing at Havana, in the Island of Cuba, West India Islands, have invented certain new and useful Improvements in Sewing-Machine Thread-Cutters, of which the following is a specification, reference being had therein to the accompanying drawings, in which—

Figure 1:
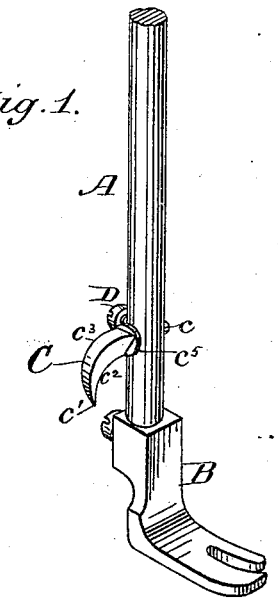
Figure 2:
Figure 3:
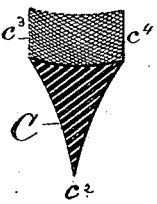

Figure 1 is a perspective view of a presser-foot and bar provided with my improved thread-cutter. Fig. 2 is a perspective of a modified form of said thread-cutter detached. Fig. 3 is an enlarged sectional view of a portion of said cutter.

Like letters refer to like parts in all the figures.

The object of my invention is to provide sewing-machines with a thread-cutting device which shall possess a plurality of cutting-edges, and which may be also adapted to serve as a needle-sharpener, as hereinafter described.

Referring to the drawings, A represents the presser-foot bar, and B the presser-foot, of a sewing-machine. C represents a thread-cutter constructed in accordance with my invention, and connected with the bar A by means of a shank, $c$, which is passed through a hole in the bar, and is secured therein by means of a set-screw, D. If desired, the shank may be screw-threaded, as shown in Fig. 2, to fit a similarly screw-threaded hole in the bar A, in which case no set-screw D will be required. The body portion of the cutter C is curved lengthwise, and terminates in a point, $c'$, and in cross-section is triangular. The three sides of the cutter may be plain, as shown in Fig. 1; or the two lower sides may be plain and the upper side may be concave, as shown in Fig. 2; or all three of the sides may be concave, as shown in Fig. 3, the essential requisite being that, whatever the relative position or the surface of each side, the angles which they shall form along the lines where they join each other shall be acute, so as to form at least two or it may be three cutting-edges, $c^2\ c^3\ c^4$.

To adapt the thread-cutter for service as a needle-sharpener, as sewing-machine needles often become blunted by accidentally striking the cloth-plate, I cross-check or otherwise roughen and form sharp file-like serrations and ridges on one of its sides, so that the sharpener acts like a file upon a needle rubbed against it by the operator, the cutter being made of steel or other hard or suitably-hardened metal. It will be observed that where one of the smooth sides meets the cross-checked side, a notched or serrated cutting-edge is produced, as at $c^3\ c^4$, Fig. 3, and this kind of edge is the most suitable for cutting thread.

As shown in the drawings, there is between the body of the cutter and its shank a shoulder, $c^5$. This may be constructed integrally; or a washer fitting the shank may be used to form such a shoulder; or the shoulder and washer may be entirely omitted, as I do not wish to limit myself in this particular feature. As shown in Fig. 1, the cutter is secured to the bar in such a position as to point or curve downwardly, as it is desirable that the cross-checked surface should be uppermost.

The operation of my invention is as follows: The operator of the machine, either before or after the formation of a seam, in order to sever the thread, has only to draw it across or against an edge of the cutter C. The cutter, being located at the lower portion of the bar, does not interfere with the performance of its own function or those of the bar, and when adapted for use as a needle-sharpener is readily accessible for that purpose.

Having described the construction and operation of my invention, what I claim as new, and desire to secure by Letters Patent, is—

1. As an article of manufacture, a thread-cutter and needle-sharpener composed of a hooked blade triangular in cross-section, and having one of its sides concaved and cross-checked, as a file, substantially as and for the purpose set forth.

2. The combination, with the presser-bar A, of the cutter C, having the curved point $c'$, the cutting-edges $c^2\ c^3\ c^4$, and shank $c$, with the set-screw D, substantially as shown and described.

In testimony whereof I affix my signature in presence of two witnesses.

JOSE VALERO.

Witnesses:
E. E. MASSON,
L. C. HILLS.